United States Patent [19]

Nickel et al.

[11] 4,225,493
[45] Sep. 30, 1980

[54] DISAZO DYESTUFFS DERIVED FROM THREE CARBOCYCLIC COMPONENTS INCLUDING A TERMINAL COMPONENT SUBSTITUTED WITH SULFO AND ALKOXY

[75] Inventors: Horst Nickel; Fritz Suckfüll, both of Leverkusen, Fed. Rep. of Germany

[73] Assignee: Bayer Aktiengesellschaft, Leverkusen, Fed. Rep. of Germany

[21] Appl. No.: 621,806

[22] Filed: Oct. 14, 1975

Related U.S. Application Data

[63] Continuation of Ser. No. 29,239, Apr. 16, 1970, abandoned.

[30] Foreign Application Priority Data

Apr. 25, 1969 [DE] Fed. Rep. of Germany ....... 1921046

[51] Int. Cl.³ .................. C07C 107/04; C09B 31/065; C09B 43/00
[52] U.S. Cl. ..................................... 260/186; 260/187; 260/191; 260/196; 260/198; 260/199; 260/205; 260/206; 260/207; 260/207.1; 260/208
[58] Field of Search ............... 260/174, 177, 184, 185, 260/186, 187, 191

[56] References Cited

U.S. PATENT DOCUMENTS

| | | | |
|---|---|---|---|
| 3,451,991 | 6/1969 | Kleiner | 260/187 |
| 3,485,814 | 12/1969 | Speck | 260/186 |
| 3,676,050 | 7/1972 | James | 260/184 X |
| 3,862,119 | 1/1975 | Stingl | 260/186 |
| 3,951,590 | 4/1976 | Studer | 260/191 X |

*Primary Examiner*—Charles F. Warren
*Attorney, Agent, or Firm*—Sprung, Felfe, Horn, Lynch & Kramer

[57] ABSTRACT

Disazo dyestuffs which in the form of the free acid correspond to the formula

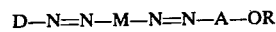

D—N=N—M—N=N—A—OR wherein
M represents a 1,4-phenylene or 1,4-naphthylene residue which is optionally substituted by halogen, alkyl, alkoxy or acylamino groups,
A represents a phenyl residue which is optionally substituted by halogen or alkyl groups and which contains a sulphonic acid group which is bonded directly or via a bridge member,
R represents hydrogen or an alkyl group with 1-7 C atoms and
D represents a benzene nucleus which is optionally substituted by halogen, alkyl or carbonamide groups.

The dyestuffs are particularly suitable for the dyeing and printing of natural and synthetic fibre materials containing amide groups.

2 Claims, No Drawings

DISAZO DYESTUFFS DERIVED FROM THREE CARBOCYCLIC COMPONENTS INCLUDING A TERMINAL COMPONENT SUBSTITUTED WITH SULFO AND ALKOXY

This is a Continuation, of application, Ser. No. 29,239, filed Apr. 16, 1970 now abandoned.

The subject of the present invention are disazo dyestuffs containing sulphonic acid groups, which in the form of the free acid correspond to the formula $$D-N=N-M-N=N-A-OR \quad (I)$$

wherein,

M represents a 1,4-phenylene or 1,4-naphthylene residue which is optionally substituted by halogen, alkyl, alkoxy or acylamino groups, A represents a phenyl residue which is optionally substituted by halogen or alkyl groups and which contains a sulphonic acid group which is bonded directly or via a bridge member, R represents hydrogen or an alkyl group with 1-7 C atoms and D represents a benzene nucleus which is optionally substituted by halogen, alkyl or carbonamide groups. Preferred dyestuffs are herein those of formula

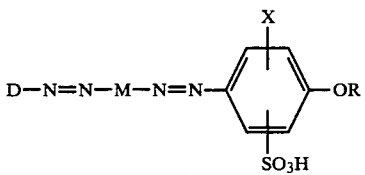

wherein D, R and M have the abovementioned significance and X represents an alkyl group or halogen, preferably methyl, chlorine or bromine.

By alkyl groups, there are especially to be understood those with 1-7 C atoms, which can optionally possess further substituents, for example halogen atoms. By way of example there may be mentioned: CH$_3$, C$_2$H$_5$, C$_3$H$_7$, CF$_3$, C$_4$H$_9$, CH$_2$—C$_6$H$_5$, C$_2$H$_4$—OH.

Suitable alkoxy groups are for example those with 1-4 C atoms such as OCH$_3$, OC$_2$H$_5$ and OC$_4$H$_9$.

Suitable acylamino groups are, for example, formylamino groups as well as optionally substituted alkylcarbonylamino groups, such as acetylamino, chloracetylamino and propionylamino groups, and also arylcarbonylamino groups, especially optionally substituted phenycarbonylamino groups, such as benzoylamino, 4-chlorobenzoylamino, 3- or 4-methylbenzoylamino, 3-trifluoromethylbenzoylamino and also alkyl- and arylsulphonylamino groups.

Suitable carbonamide groups are, in addition to —CONH$_2$, monosubstituted or disubstituted carbonamide groups, such as carboxylic acid monoalkylamide and carboxylic acid dialkylamide groups. By way of example, the following may be mentioned: CONHCH$_3$, CONHC$_2$H$_5$, CONHC$_3$H$_7$, CON(CH$_3$)$_2$, CON(C$_2$H$_5$)$_2$.

As halogen atoms, Cl, Br and F may be mentioned. Suitable bridge members in the ring A are especially alkylene groups such as —CH$_2$— or phenylene residues such as, for example, —C$_6$H$_4$— or O-alkylene residues such as —O—C$_2$H$_4$—.

The manufacture of the dyestuffs of formula (I) takes place by coupling diazotised aminoazo compounds of formula $$D-N=N-M-NH_2 \quad (III)$$

wherein D and M have the significance given in formula (I), with coupling components of formula $$H-A-OH \quad (IV)$$

wherein A has the significance given in formula (I), and optionally subsequently alkylating the disazo dyestuffs of formula $$D-N=N-M-N=N-A-OH \quad (V)$$

thus obtained. The coupling takes place in the usual manner, preferably in an aqueous alkaline medium. The dyestuffs are separated out and isolated in a known manner, for example by salting out with sodium chloride or potassium chloride.

The alkylation which is optionally to be carried out takes place by reaction with suitable alkylating agents such as esters of strong mineral acids and organic sulphonic acids of preferably low molecular alcohols, such as alkyl chlorides, bromides, or iodides, aralkyl halides, dialkyl sulphates and esters of sulphonic acids of the benzene series, such as the methyl, ethyl, propyl and n-butyl esters of benzenesulphonic acid, p-toluenesulphonic acid and p-chlorobenzenesulphonic acid.

By way of example there may be mentioned: dimethylsulphate, diethyl sulphate, methyl iodide, ethyl chloride, benzyl bromide and propyl bromide.

The reaction with the alkylating agents is carried out in the usual manner, for example in an aqueous-alkaline medium.

Aminoazo compounds of formula (III) are known. In general they are obtainable by coupling a diazotised amine with an amino compound H—M—NH$_2$, wherein M has the abovementioned significance, in an acid medium. In place of the amino compound H—M—NH$_2$, the N-methane-acid can optionally be used, from which the methane-sulphonic acid group is split off after the coupling. By way of example, the following aminoazo compounds may be mentioned: 4-amino-azobenzene, 4'-chlor-4-amino-azobenzene, 3'-chlor-4-amino-azobenzene, 2'-chlor-4-amino-azobenzene, 2',5'-dichlor-4-amino-azobenzene, 2',4'-dichlor-4-amino-azobenzene, 3',4'-dichlor-4-amino-azobenzene, 3,4'-dichlor-4-amino-azobenzene, 4'-methyl-4-amino-azobenzene, 3'-methyl-4-amino-azobenzene, 2'-methyl-4-amino-azobenzene, 4'-chloro-2-methyl-4-amino-azobenzene, 4'-chlor-2-acetylamino-4-amino-azobenzene, 2,3'-dimethyl-4-amino-azobenzene, 3,2'-dimethyl-4-amino-azobenzene, 2,4'-dimethyl-4-amino-azobenzene, 3-methoxy-4-amino-azobenzene, 2-methoxy-4-amino-azobenzene, 4'-chloro-2-methoxy-4-amino-azobenzene, 2,5-dimethoxy-4-amino-azobenzene, 2-methyl-5-methoxy-4-amino-azobenzene, 2-methyl-5-ethoxy-4-amino-azobenzene, 2-methoxy-5-methyl-4-amino-azobenzene, 2-methyl-5-methoxy-4'-chlor-4-amino-azobenzene, 2,3'-dimethyl-5-methoxy-4-amino-azobenzene, 4'-trifluoromethyl-4-amino-azobenzene, 2'-trifluoromethyl-4'-chlor-4-amino-azobenzene, 2'-trifluoromethyl-4'-chloro-2-methyl-4-amino-azobenzene, 4'-trifluoromethyl-2-acetylamino-4-amino-azobenzene, 3'-chloro-4'-trifluoromethyl-4-aminoazobenzene, 3'-4'-trifluoromethyl-2-methyl-4- aminoazobenzene, 4-amino-1-[benzeneazo]-naphthalene, 4-amino-1-[4'-chlorobenzeneazo]-naphthalene, 4-amino-1-[2',5'-dichlorobenzeneazo]-naphthalene, 4-amino-1-[3',4'-dichlorobenzeneazo]-naphthalene, 4-amino-1-[3'-methylbenzeneazo]-naphthalene, 4-amino-3-methoxy-1-[benzeneazo]-naphthalene, 4-amino-3-methoxy-1-[4'-chlorobenzeneazo]-naphthalene and 4-amino-3-methoxy-1-[4'-trifluoromethylbenzeneazo]-naphthalene.

Suitable coupling components H—A—OH are, for example: 1-hydroxybenzene-2-, or -3-, or -4-sulphonic acid, 1-methyl-2-hydroxybenzene-4-sulphonic acid, 4-chloro-3-hydroxybenzene-1-sulphonic acid and 3- or -4-hydroxybenzylsulphonic acid.

The new dyestuffs are particularly suitable for dyeing and printing natural and synthetic fibre materials containing amide groups, for example those consisting of wool, silk and polyamide fibres. The resulting dyeings, especially those on polyamide materials, are distinguished by good fastness properties, especially by good wet fastness properties and very good light fastness properties. The neutral affinity and the behaviour on combination with other suitable dyestuff materials are also good.

EXAMPLE 1

19.7 parts by weight (0.1 mol) of 4-aminoazobenzene are vigorously stirred with 200 parts of water and 28 parts of 28% strength hydrochloric acid and diazotised in the usual manner with 70 parts of 10% strength nitrite solution at 10°. After completion of addition of the nitrite, the mixture is stirred for a further hour and clarified with active charcoal if appropriate, and excess nitrous acid is removed with amidosulphonic acid.

The diazonium solution is added to a solution of 17.4 parts by weight (0.1 mol) of phenol-3-sulphonic acid in 2000 parts of water, 4% strength sodium hydroxide solution is simultaneously added dropwise at pH 6, and coupling is completed at the pH value at room temperature. After completion of the coupling, the mixture is rendered alkaline with sodium hydroxide solution, the dyestuff solution is clarified with active charcoal, the filtrate is adjusted to pH 6 to 7, and the dyestuff is precipitated by adding sodium chloride, isolated and dried. In the form of the free acid, the dyestuff obtained corresponds to the formula

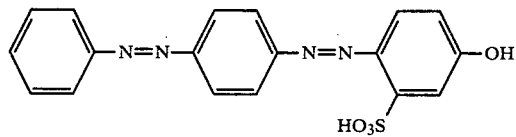

and represents a dark powder which gives a yellow solution in water. Polyamide material is dyed in light-fat and wet-fast yellow-orange shades.

Dyeing procedure 100 milligrams of the dyestuff are dissolved in 100 parts of hot water, 4 milliliters of 10% strength acetic acid are added and a 10 gram hank of polyamide fibres is introduced into the dyebath. The dyebath is brought to the boil over the course of 20 minutes and then kept thereat for 1 hour. Thereafter the material is rinsed and dried at 70° to 80°. A yellow-orange dyeing is obtained.

Further dyestuffs of this type are quoted in the table which follows.

| Diazo Component | Coupling Components | Colour Shade on Polyamide |
|---|---|---|
| 4-Aminoazobenzene | Phenol-2-sulphonic acid | yellow-orange |
| 4-Aminoazobenzene | Phenol-4-sulphonic acid | yellow-orange |
| 4-Aminoazobenzene | 3-Hydroxybenzylsulphonic acid | yellow-orange |
| 2-Methyl-4-aminoazobenzene | Phenol-2-sulphonic acid | yellow-orange |
| 2,3'-Dimethyl-4-amino-azobenzene | Phenol-2-sulphonic acid | yellow-orange |
| 2,3'-Dimethyl-4-amino-azobenzene | Phenol-3-sulphonic acid | yellow-orange |
| 2,3'-Dimethyl-4-amino-azobenzene | Phenol-4-sulphonic acid | yellow-orange |
| 4'-Chlor-4-amino-azobenzene | Phenol-2-sulphonic acid | yellow-orange |
| 4'-Chlor-4-amino-azobenzene | Phenol-3-sulphonic acid | yellow-orange |
| 4'-Chlor-4-amino-azobenzene | 3-Hydroxybenzylsulphonic acid | yellow-orange |
| 3,2'-Dimethyl-4-amino-azobenzene | Phenol-2-sulphonic acid | yellow-orange |
| 4'-Trifluoromethyl-2-methyl-4-amino-azobenzene | Phenol-2-sulphonic acid | yellow-orange |
| 4'-Trifluoromethyl-2-methyl-4-amino-azobenzene | Phenol-4-sulphonic acid | yellow-orange |
| 4'-Trifluoromethyl-2-methyl-4-amino-azobenzene | Phenol-3-sulphonic acid | yellow-orange |
| 2'-Trifluoromethyl-4'-chloro-4-amino-azobenzene | Phenol-3-sulphonic acid | yellow-orange |
| 2'-Trifluoromethyl-4'-chloro-2-methyl-4-amino-azobenzene | Phenol-3-sulphonic acid | yellow-orange |
| 4-Amino-1-[benzeneazo]-naphthalene | Phenol-3-sulphonic acid | orange |
| 4-Amino-1-[benzeneazo]-naphthalene | Phenol-2-sulphonic acid | orange |

EXAMPLE 2

38.2 parts by weight (0.1 mol) of the diazo dyestuff of formula

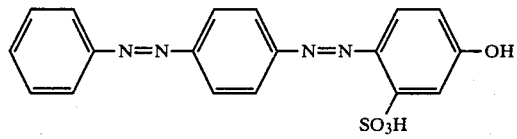

manufactured according to Example 1 are dissolved in 800 parts of hot water at pH 7 to 8. About 40 parts of dimethyl sulphate are added dropwise with vigorous stirring at 50° to 60° and whilst maintaining a pH value of 7 to 9 by addition of dilute sodium hydroxide solution, until the methylation, which is followed chromatographically, is finished.

After the end of the reaction the precipitated dyestuff is isolated at room temperature, where appropriate by addition of sodium chloride, and is dried.

The dyestuff represents a dark powder which gives a yellow solution in water. Perlon material is dyed in yellow shades according to the dyeing procedure described. The dyeings possess good wet fastness properties and excellent light fastness properties.

If diethyl sulphate or ethyl bromide is used for the alkylation, dyestuffs are obtained which give a yellow solution in water and which dye polyamide material in yellow shades of good neutral affinity.

If the dyestuff of formula

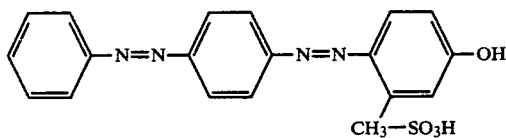

is ethylated with diethyl sulphate as previously indicated, a dyestuff is obtained which gives a yellow solution in water and dyes polyamide material in yellow shades. The methylation in dimethyl sulphate yields a similar dyestuff.

If the dyestuff of formula

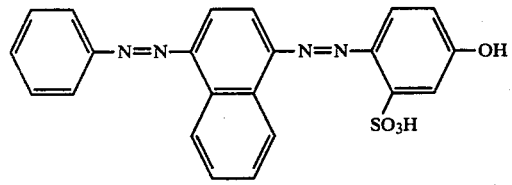

is reacted with dimethyl sulphate or diethyl sulphate, dyestuffs are obtained which dye polyamide material in orange-coloured shades.

We claim:

1. Disazo dyestuff, which in the form of the free acid, corresponds to the formula

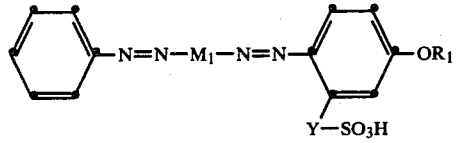

wherein
$M_1$ represents 1,4-phenylene;
$R_1$ is methyl or ethyl;
Y is a direct bond or methylene.

2. Disazo dyestuff which in the form of the free acid corresponds to the formula

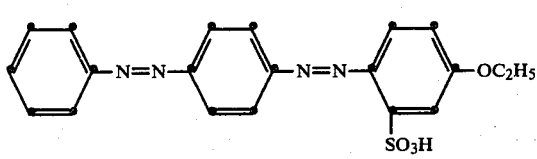

* * * * *